United States Patent [19]
Gerbus et al.

[11] Patent Number: 6,126,738
[45] Date of Patent: *Oct. 3, 2000

[54] METHOD FOR PRODUCING AGGREGATE

[75] Inventors: John W. Gerbus, Cincinnati; Daniel P. Ivkovich, Fairfield, both of Ohio

[73] Assignee: TransAsh, Cincinnati, Ohio

[ * ] Notice: This patent is subject to a terminal disclaimer.

[21] Appl. No.: 09/111,095

[22] Filed: Jul. 6, 1998

[51] Int. Cl.⁷ .................................................. C04B 18/02
[52] U.S. Cl. ......................... 106/710; 106/792; 106/799; 106/DIG. 1; 106/679; 264/333; 264/DIG. 49
[58] Field of Search ............................. 106/705, DIG. 1, 106/710, 792, 799, 679; 264/333, DIG. 49

[56] References Cited

U.S. PATENT DOCUMENTS

| | | |
|---|---|---|
| Re. 34,775 | 11/1994 | Nechvatal et al. . |
| 3,765,920 | 10/1973 | Humphrey . |
| 3,785,840 | 1/1974 | Minnick et al. .................... 106/DIG. 1 |
| 3,852,084 | 12/1974 | Webster et al. .................... 106/DIG. 1 |
| 4,018,619 | 4/1977 | Webster et al. .................... 106/DIG. 1 |
| 4,040,852 | 8/1977 | Jones . |
| 4,082,561 | 4/1978 | Nakagawa et al. . |
| 4,105,463 | 8/1978 | Angelbeck ............................. 106/710 |
| 4,172,518 | 10/1979 | Grayson . |
| 4,210,457 | 7/1980 | Dodson et al. . |
| 4,217,143 | 8/1980 | Reich et al. . |
| 4,229,222 | 10/1980 | Schneider . |
| 4,268,316 | 5/1981 | Wills, Jr. . |
| 4,496,267 | 1/1985 | Graedinger ............................. 106/697 |
| 4,547,223 | 10/1985 | Goto et al. . |
| 4,624,711 | 11/1986 | Styron . |
| 4,770,831 | 9/1988 | Walker .............................. 106/DIG. 1 |
| 4,804,147 | 2/1989 | Hooper . |
| 4,909,849 | 3/1990 | Funderburk . |
| 4,992,102 | 2/1991 | Barbour . |
| 5,137,753 | 8/1992 | Bland et al. . |
| 5,196,620 | 3/1993 | Gustin et al. . |
| 5,211,750 | 5/1993 | Smith et al.. ...................... 106/DIG. 1 |
| 5,230,587 | 7/1993 | Pensoneau . |
| 5,266,111 | 11/1993 | Barbour . |
| 5,322,562 | 6/1994 | Ellenberger et al. . |
| 5,352,035 | 10/1994 | Macaulay et al. . |
| 5,352,288 | 10/1994 | Mallow . |
| 5,401,312 | 3/1995 | Hanst ....................................... 106/706 |
| 5,484,479 | 1/1996 | Weber . |
| 5,500,044 | 3/1996 | Meade et al. . |
| 5,542,977 | 8/1996 | Hanst ....................................... 106/706 |
| 5,609,836 | 3/1997 | McManus et al. . |
| 5,704,972 | 1/1998 | Ivkovich .................................. 106/710 |

FOREIGN PATENT DOCUMENTS 6507998  12/1966  Netherlands .

OTHER PUBLICATIONS

"Characterization & Agglomeration of Brazilian Coal Ashes" Andrade et al Proc Inst Briquet Agglom Bienn Conf (1986) pp. 297–308.

"Use of Waste Mat'ls from Coal Combustion in Road Construction, A Summary" Hoebeda Energy Research Abstract (1985), 10(2), Abst No. 1793.

"Production of Artifical Aggregates from Fly Ash" Goksel et al. Proc Inst Briquet Agglom Bienn Conference (1984).

*Primary Examiner*—Paul Marcantoni
*Attorney, Agent, or Firm*—Steven J. Rosen

[57] ABSTRACT

A method for making aggregate includes the following steps: (a) preparing a wet mixture by mixing water with a combination of ingredients in a mixer, the combination of ingredients including by weight about, 68% to 95% fly-ash and 2% to 10% lime; (b) dropping the wet mixture into at least one pile on a base surface; (c) allowing the wet mixture in the pile to substantially completely hydrolyze into a hard product; and (d) crushing the product to form the aggregate. Preferably, step (b) further includes forming an arcuate stack having multiple overlapping conical piles of the dropped wet mixture such that the stack extends a circular distance over the surface. The wet mixture may be transported from the mixer to a height above the surface and dropped to the surface by a radial stacker. The combination of ingredients, preferably, further includes by weight 0.5% to 12% alkali hydroxide and, more particularly, sodium hydroxide.

22 Claims, 3 Drawing Sheets

METHOD FOR PRODUCING AGGREGATE

BACKGROUND OF THE INVENTION

1. Field of the Invention

The present invention relates to products and processes that use fly-ash for producing aggregates useful in the production of structural products.

2. Discussion of the Background Art

Aggregate, as referred to herein, is a term which includes natural aggregate, such as sand, gravel and crushed stone, as well as synthetic aggregate of various kinds, including light-weight aggregate such as cinders and aggregate produced through the combustion of pulverized powdered coal. Generally, aggregate may be used in a variety of construction and landscaping applications. For example, aggregate is an essential ingredient in most concrete formulations, including, both pre-cast and cast-in-place concrete. Aggregate is also used as a foundation material for paving and as a backfill material. Aggregate is also used in landscaping applications in both a decorative and functional manner.

When used as a construction material, aggregate is frequently required to meet certain requirements relating to its physical and chemical characteristics. Those characteristics indicate the level of quality to which it conforms. Durability is one of the most significant elements of quality in aggregate. The prior art recognizes there is a great desire to use fly-ash as a major ingredient in the manufacture of a synthetic aggregate. Fly-ash is the finely divided residue resulting from the combustion of material containing coal as its major fuel source for combustion, such as that which is produced in electricity generating power plants. The fuel may also contain tires, wood, and/or other petro-coke constituents. It is typically collected as a fine particulate from the combustion gases before they are discharged into the atmosphere. Generally, there are two more particular classes of fly-ash, the composition of which is dependent upon the composition of the original combustible material from which it is derived. Class F fly-ash is normally produced from anthracite or bituminous coal and has pozzolanic properties, i.e. little or no cementitious value, but capable of chemically reacting with calcium hydroxide to form compounds possessing cementitious properties. Class C fly-ash is normally produced from lignite or sub-bituminous coal and has some cementitious properties in addition to pozzolanic properties.

Class C fly-ash is known to be highly reactive when mixed with water and flash setting (setting which occurs in about 2 minutes or less) will generally occur unless a reaction sequestering admixture is utilized. Use of Class C fly-ash in the manufacture of light-weight aggregate and light-weight cement formulations has been suggested, for example, in U.S. Pat. Nos. 4,624,711, and 4,741,782, both to Styron, and U.S. Pat. No. 4,659,385 to Costopoluos et al. Styron suggests the use of Class C fly-ash along with a foaming agent and an accelerator, expenses the present invention seeks to avoid, to make light-weight aggregate in a pelletizing process. Depending upon the type of fly-ash used, Styron also recommends the addition of Portland cement, another expense the present invention seeks to avoid. Costopoluos suggests the use of Class C fly-ash to make a light-weight building material and the use of air entraining and chemical foaming agents which is another expense the present invention seeks to avoid.

The many methods and processes disclosed in the prior art have costs associated with them and the present invention is directed specifically towards reducing the cost of manufacturing such aggregates. Among the many costly apparatus and procedures which the present invention seeks to eliminate are pellatizers, heated kilns, large storage silos, pellatizering, vibration and other types of machine compaction, and transporting slurry used to make the aggregate.

U.S. Pat. No. 5,484,479 entitled "Method of Manufacturing Synthetic Aggregate" describes much of the background of aggregates and their use as well as disclosing a method for making synthetic aggregate using fly-ash. The method proscribes a method which combines fly-ash with water to form a soil-like mixture which is then compacted into slabs and allowed to set. After setting, the material is crushed to appropriate size. Since fly-ash and water mixtures set quickly, and since compaction should take place prior to setting of the mixture, a set sequestering admixture may be used to facilitate the process. This process uses dry Class C fly-ash metered from a container which is then introduced to a mixing device where it is sprayed with a fine mist of water droplets. The fly-ash and water are metered at rates sufficient to produce a soil-like mixture. The mixture is then distributed and uniformly consolidated, preferably by mechanical compaction, to densify the mixture. The densified mixture is then allowed to cure to a hardened mass and after a predetermined minimum time, the material is then broken or crushed into appropriately sized aggregate conforming to specific gradations established for conventional crushed aggregates. However, expensive materials are used to promote the formulation of stable ettringite and straetlingite compounds which is accomplished with the use of an admixture like those used to retard the setting of portland cement. The compaction is also a costly step which the present inventions seeks to avoid. The patent suggests using sugar to form the admixture and that lignosites, both calcium and sodium, are also usable to effectively sequester or retard the setting process.

The present invention provides a method used in the process for producing an aggregate that is economical and consistent with strength standards as detailed by ASTM's (American Society for Testing Materials) specifications for aggregate. One purpose of the present invention is designed to produce such an aggregate at a low cost without the use of additional fuel for heating, heaters, or pelletizing equipment. To this end, the preferred embodiment of the present invention makes use of a radial stacker and a preferred mixture of fly-ash, hydrated lime, and alkali hydroxide. Radial stackers are well known devices as exemplified by those disclosed in U.S. Pat. Nos. 5,609,836 and 4,172,518.

U.S. Pat. No. 4,04,147 discloses the use of a radial stacker to form conical piles of a mixture containing a heavy metal immobilizing agent such as either Portland cement, lime, gypsum, caustic soda, magnesium oxide or sodium hydroxide and a volumetric stabilizing agent such as either Portland cement or sodium silicate. However the mixture and process are such that only partial hydration occurs. The resulting mixture is retained for only sufficient enough time to allow the immobilizing and stabilizing reactions to occur and weak agglomerations to form. This process is more expensive and time consuming than the present invention and does not produce as hard an aggregate. The preferred mixture of the present invention was disclosed in U.S. Pat. No. 5,704,972 entitled "Product and Process for Strong Light-Weight Aggregate".

SUMMARY OF THE INVENTION

The present invention provides a method for making aggregate which includes the following steps: (a) preparing a wet mixture by mixing water with a combination of ingredients in a mixer, the combination of ingredients including by weight about, 68% to 95% fly-ash and 2% to 10% lime; (b) dropping the wet mixture into at least one pile on a base surface; (c) allowing the wet mixture in the pile to substantially completely hydrolyze into a hard product; and (d) crushing the product to form the aggregate. Preferably, step (b) further includes forming a stack having multiple overlapping piles of the dropped wet mixture such that the stack extends a distance over the surface. The wet mixture may be transported from the mixer to a height above the surface and dropped to the surface by a radial stacker. The radial stacker may be incrementally stepped through an arc in a plane parallel to the surface and stopping at angular positions of the arc to drop the wet mixture and form each of the piles of the stack such that the stack extends a circular distance over the surface. An excavation step (c1) between the steps (c) and (d) may be used to break up the stack. The excavation step (c1) includes excavating the substantially completely hydrolyzed portions of the stack to collect corresponding portions of the hard product and transporting the excavated portions of the hard product to a crusher for the crushing in step (d). Preferably, the excavation step (c1) is performed while the radial stacker is performing the dropping of the wet mixture in step (b).

Step (b) may further include having the radial stacker cycling through the entire arc in about between 20–30 days during which the piles and the stack are formed from a beginning of the stack to an end of the stack. The excavation step (c1) is initiated at the beginning of the stack after an initial curing period of the stack of about between 14 to 28 days after the step (b) is initiated and during which the stack is hydrolyzing. The excavation may be done with a loader that breaks up the stack and transports the hard product to the crusher for crushing. Steps (a) through (d) may be performed on a coal burning plant site using fly-ash from a combustion process of the plant.

The base surface is preferably on a drainage base to run off water that seeps to the base surface from the stack and direct the water away from the piles and stack. Preferably, the multiple overlapping piles are generally conical in shape and may have peaks at heights in a range of about between 8 to 50 feet from the base surface and have diameters at the base surface in a range of about between 16 to 100 feet.

The combination of ingredients, preferably, further includes by weight 0.5% to 12% alkali hydroxide and, more particularly, sodium hydroxide.

ADVANTAGES OF THE INVENTION

The present invention provides a light-weight aggregate that uses fly-ash waste product and is economical, strong, hard, and consistent with standards as detailed by ASTM's specifications for light-weight aggregate.

One advantage of the present invention is that fly-ash, an industrial by-product which usually represents a solid waste disposal expense to the producer, is utilized for a beneficial purpose, thereby, reducing disposal expenses. Another advantage is that the present invention will help reduce use of landfills because fly-ash is typically disposed of in landfills and the present invention can reduce use of expensive and undesirable landfills.

Another advantage obtained by the present invention is that the aggregate produced is strong enough to meet current ASTM standards for light-weight aggregates for use in various building materials. Another advantage of the present invention is that the aggregates produced by the present process are strong enough to meet the ASTM standards and are light enough to be classifiable as light-weight aggregates that have a wide range of desirable applications such as concrete masonry units, structural concrete, and insulating concrete.

Another advantage of the present invention is that the light-weight aggregates can be cured at ambient temperatures, and does not need to be fired, heated, compressed, or pelletized. This feature has the advantage of reducing the production, transportation, and energy costs as well as capital equipment expenses required by prior art methods to manufacture the aggregate.

BRIEF DESCRIPTION OF THE DRAWINGS

The novel features believed characteristic of the present invention are set forth and differentiated in the claims. The invention, together with further objects and advantages thereof, is more particularly described in conjunction with the accompanying drawings in which:

FIG. 1A is a schematic illustration of a wet mixture in FIG. 1 made up of clumps of small particles accordance with the exemplary embodiment of the present invention;

DETAILED DESCRIPTION

Figure 1:
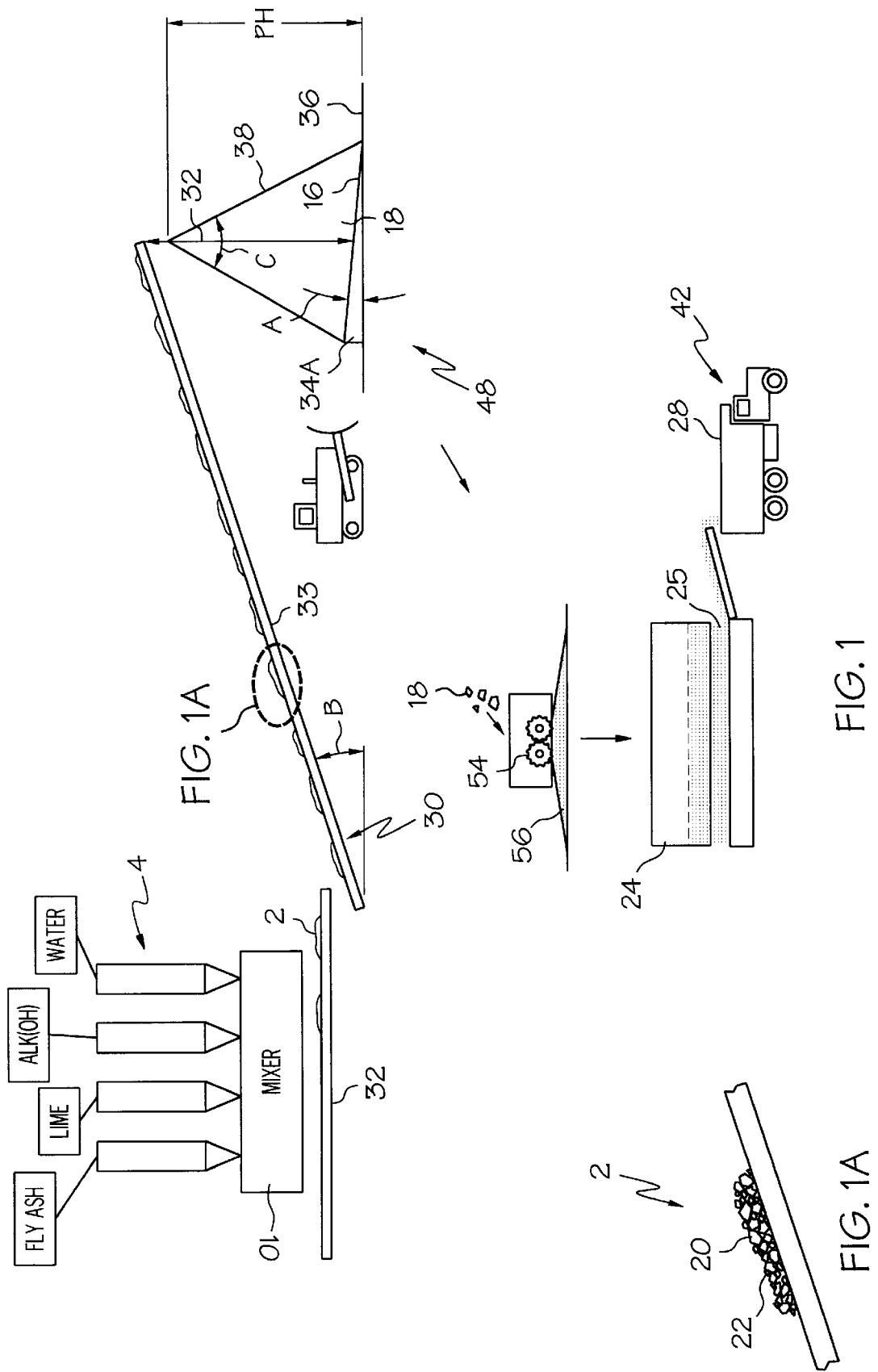
FIG. 1 is a schematical diagram illustrating a method and system for producing aggregate in accordance with an exemplary embodiment of the present invention.

FIG. 1 illustrates a method and apparatus for making aggregate 56 in accordance with an exemplary embodiment of the present invention. This includes the following steps: (a) preparing a wet mixture 2 by mixing water with a combination of ingredients in a mixer 10, the combination of ingredients including by weight about, 68% to 95% fly-ash and 2% to 10% lime; (b) dropping the wet mixture 2 into one or more of generally conical piles 38 on a base surface 16; (c) allowing the wet mixture 2 in the one or more piles 38 to substantially completely hydrolyze into a hard product 18; and (d) crushing the product 18 with a crusher 54 to form the aggregate 56. The aggregate 56 may then be screened with commercially available screening apparatus 24 to produce aggregate with a predetermined size. A preferred embodiment or formulation of the combination of ingredients, preferably, further includes by weight 0.5% to 12% alkali hydroxide and, more particularly, sodium hydroxide. The fly-ash should be Type F or Type C fly-ash and the alkali hydroxide Alk(OH) is preferably Sodium Hydroxide. The combination of ingredients may be an admix in which case the alkali hydroxide is a dry alkali hydroxide. These constituent chemicals are illustrated in the schematic process diagram in FIG. 1. The admix is preferably made by dry dispensing the constituents from hoppers 4 into the mixer 10 and dry mixing the constituents for about one minute to form an even and uniform admixture. Water is then added to the mixer as the mixer is operating to form the wet mixture. The admix and water is then preferably mixed for an additional five minutes. Water is added in a range of 10% to 25% by weight of the dry mixture. The alkali hydroxide may also be used in liquid form, in which case it is added after dry mixing of the other constituents and before the water is added.

The mixture may contain reactant(s) which produce the alkali hydroxide. Such alkali hydroxide producing reactants include $Na_2CO_3$ together with $Ca(OH)_2$ and $KCO_3$ together with $Ca(OH)_2$, the reactions of which are shown below. The mixture in such a case includes three constituents comprising fly-ash, hydrated lime, and alkali hydroxide producing reactants which results in the mixture having 68% to 95% fly-ash, 2% to 10% hydrated lime, and 0.5% to 12% alkali hydroxide by weight of the three constituents. A surfactant may be added to the water in sufficient amounts to reduce the surface tension of the water in order to enhance the reactions.

The water is added until the wet mixture 2 has a desired consistency. The consistency of the wet mixture may be between that of a slurry and one having small nuggets or particles 22, as illustrated in FIG. 1A, depending on the amount of water added. The particles 22 are such that when the wet mixture 2 is dispensed from the mixer 10 it forms clumps 20 made up of the small particles 22 which adhere to each other. The preferred consistency of the wet mixture is one having small particles 22. There is a great deal of latitude in adjusting the amount of water to get the desired consistency of the wet mixture. The slurry form may be a thick viscous fluid while the clumps may come out having sizes on the order of 1 foot by 1 foot with irregular shaped particles 22 being about between 1/16 to 5/8 of an inch long.

Figure 2:
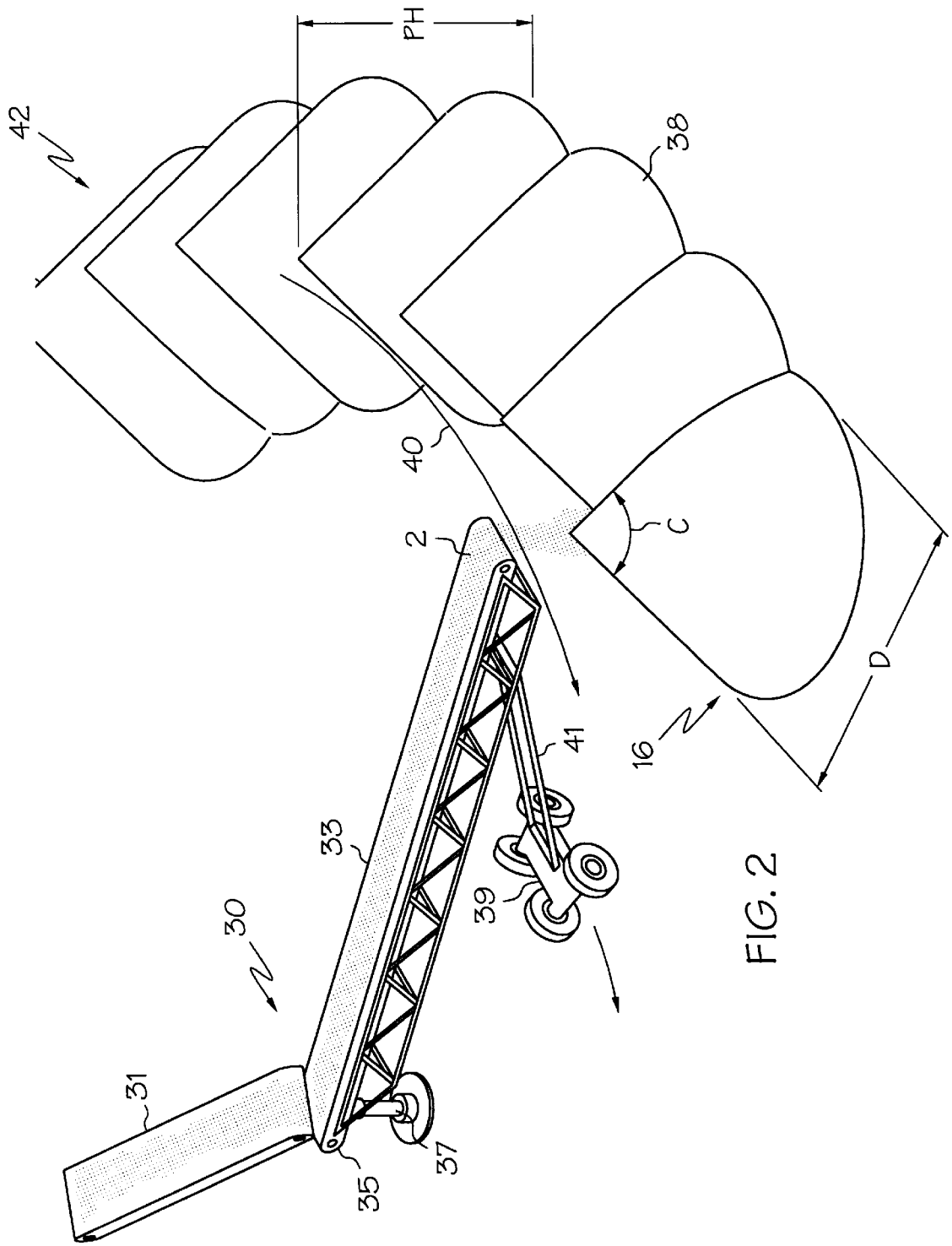
FIG. 2 is a perspective view diagrammatic illustration of radial stacker and a stack along an arc of the process illustrated in FIG. 1.
Figure 3:
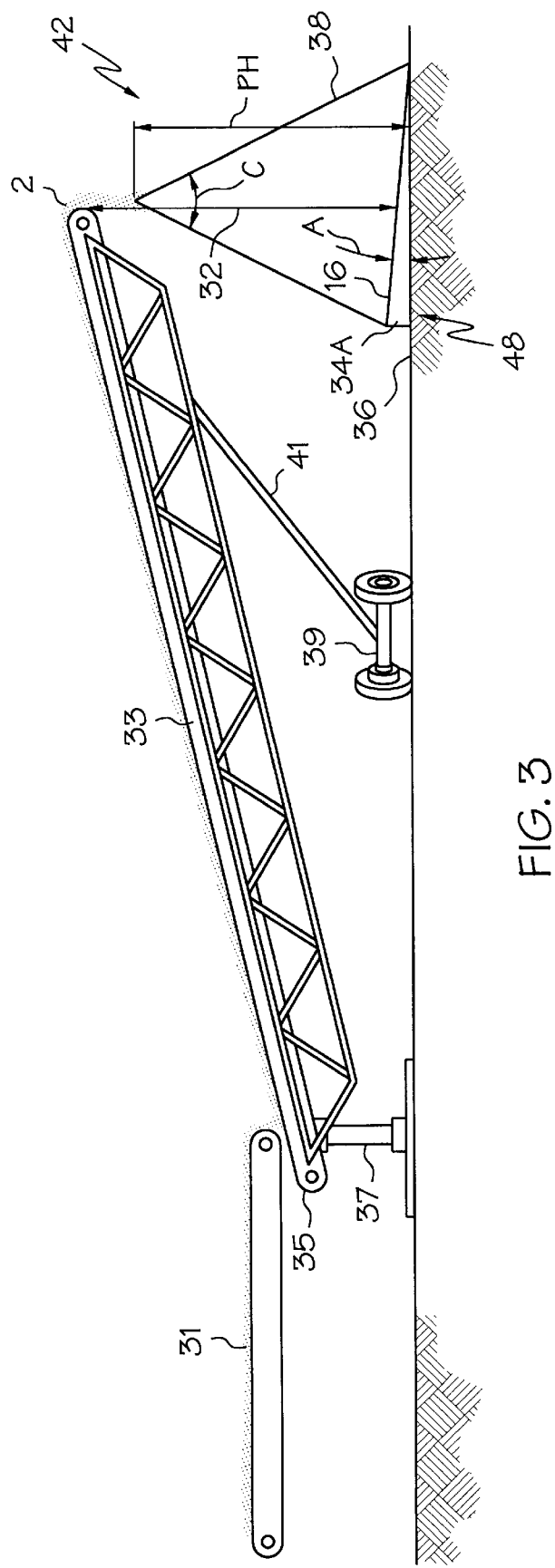
FIG. 3 is a partial perspective and partial elevational diagrammatic view illustration of the radial stacker and the stack on a drainage pad illustrated in FIG. 2.

Referring to FIGS. 1, 2 and 3, the wet mixture is dispensed from the mixer 10 and loaded on to a radial stacker 30, or some other transport means, for transport to a drop height 32 over the base surface 16 which preferably lies on the ground 36. The exemplary radial stacker 30 illustrated in the FIGS. uses a horizontal conveyor 31 to transport the wet mixture 2 from the mixer 10 to an inclined conveyor 33 of radial stacker. The inclined conveyor may be inclined at a climb angle B of about 22 degrees with respect to the ground. The inclined conveyor 33 is pivoted on a support 37 at a first end 35 near the horizontal conveyor 31 and is supported by a movable frame 39 having a support tower 41 for elevating or inclining the inclined conveyor. Motive means for moving the frame is not shown. The wet mixture is dropped from the drop height 32 to the base surface 16 forming one or more of the generally conical piles 38. In the exemplary embodiment the radial stacker 30 is preferably stepped through a horizontal arc 40 to form multiple overlapping piles 38 preferably in a continuous arcuate stack 42 made of the overlapping conical piles 38. Each of the piles 38 is generally conical in shape. The present invention also contemplates using other transport means having as conveyors for forming non arcuate stacks of overlapping piles, such as straight or linear stacks.

The piles 38 are allowed to substantially completely hydrolyze at ambient conditions outside. The uniquely formed and shaped piles and mixture allows temperatures inside the piles to reach up to about 200° F. No protective covering is required though the piles 38 and stack 42 are preferably formed outdoors although they may be formed indoors or under a cover to provide protection from rain. The stack 42 and its conical piles 38 form a hard outer surface 46. Another preferred embodiment feature of the present invention is a drainage base 48 upon which the piles 38 and the stack 42 sit and drains away rain water running down the outside of the piles and which seeps down through the piles. It is preferred that the rain water be drained away from the piles 38 so as not to interfere with or inhibit curing of the piles and stack. One form of the drainage base 48 is a raised inclined pad 34A built above the surrounding ground 36. The pad 34A may be inclined at a small angle A such that the base surface 16 is also inclined to allow the water to run off the pad and away from the piles 38 and stack 42. The pad 34A may be constructed of hard earth or other suitable material. Alternatively, the drainage base 34 may be made of a hard porous material or other suitable material that will allow rain water to be drain away from the piles 38 and stack 42.

The conical shape of the piles 38 in the stack 42 helps to form a hard outer surface or shell which is substantially impervious to water. The conical shape of the piles 38 in the stack 42 and the preferred formulation of the wet mixture, having NaOH or other suitable alkali hydroxide, also provides the process with an improved ability to cure or substantially completely hydrolyze faster than prior art methods and do so out in the open and under rainy conditions. The preferred formulation of the wet mixture provides quick setting of soluble silicates, formed during the mixing, in the outermost surfaces of the particles 22. This produces a structural shell around the particles 22 which provides integrity to the particles 22 during transport and dropping and also seals the particles which prevents the escape of trapped water which is needed to carry out the slower hydrolysis reactions which begin after the dropping step and continues during the formation of the piles 38 and the stack 42.

An excavation step (c1) is preferably performed between the hydrolyzing step (c) and the crushing step (d). The excavation step (c1) preferably uses a loader to excavate and break up the cured or substantially completely hydrolyzed portions of the stack 42 containing the hard product 18. The hard product 18 is excavated with an excavator such as a loader 50 which then can be used to transport the hard product to the crusher 54 for the crushing in step (d). Preferably, the excavation step (c1) is performed while the radial stacker is performing the dropping of the wet mixture in step (b). The radial stacker may cycle through the entire arc in about between 20–30 days during which the piles and the stack are formed from a beginning of the stack to an end of the stack. The excavation step (c1) is initiated at the beginning of the stack after an initial curing period of the stack of about between 14 to 28 days after the step (b) is initiated and during which the stack is hydrolyzing.

The entire process of the present invention, steps (a) through (d) may be performed on a coal burning plant site using fly-ash from a combustion process of the plant. The multiple overlapping generally conical piles may have peaks at peak heights PH in a range of about between 8 to 50 feet from the base surface, and have diameters D at the base surface in a range of about between 16 to 100 feet. One preferred embodiment of the stack includes overlapping conical piles 38 each having a peak height of about 8 feet with a conical angle C of about 45 degrees which are stacked through an arc of about 300 degrees. The drop height 32, from which the wet mixture is dropped from the radial stacker to the base surface, may be kept constant during the formation of each conical pile 38 and is chosen to give desired conical pile dimensions of the peak height PH and the diameter D or conical angle C.

The chemical process of the present invention using the preferred formulation of the combination of ingredients is a substantially two stage process. The first chemical reactions arise during the mixing of the admix with water and the second being the hydrolysis after the heating in the kiln.

The following exemplary reaction mechanisms are believed to be the possible first stage reactions:

1. 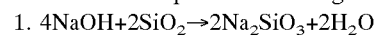 $4NaOH+2SiO_2 \rightarrow 2Na_2SiO_3+2H_2O$ or

2. $2K(OH)_2 + 3SiO_2 \rightarrow 2KSiO_3 + 4H_2O$ or using alkali hydroxide producing reactants 3. $Na_2CO_3 + Ca(OH)_2 \rightarrow CaCO_3 + 2NaOH \rightarrow$ to 1 or

4. $KCO_3 + Ca(OH)_2 \rightarrow CaCO_3 + 2K(OH)_2 \rightarrow$ to 2

All of these reactions produce a soluble silicate product. This product, which reacts with temperature and hardens, although still water soluble, provides a method in which to mass produce aggregate product using a continuous firing scheme such as in conjunction with the rotary kiln. The material after being processed through the rotary kiln can be crushed, such as by the crusher 54 or some other crushing machine, and if so desired also screened, with commercially available screening apparatus 24, to form an aggregate 25 of a desired size, wetted down and stored in a non-controlled fashion. At this point, the second reaction system takes control.

The second stage reactions are of a typical hydraulic nature. Chemicals in the mixture which contain a high percentage of calcium hydroxide will react with fly-ash present in the mixture and make use of the pozzolanic nature of the silica present in the fly-ash and carbon dioxide present in the atmosphere. This results in a final aggregate product which is light-weight, hard and strong. This final product aggregate may be used for many applications including roads, concrete structures, and fill.

While the preferred embodiment of our invention has been described fully, in order to explain its principles, it is understood that various modifications or alterations may be made to the preferred embodiment without departing from the scope of the invention as set forth in the appended claims.

What is claimed is:

1. A method for making aggregate comprising:
   (a) preparing a wet mixture by mixing water with a combination of ingredients in a mixer, the combination of ingredients comprising by weight about, 68% to 95% fly-ash and 2% to 10% lime;
   (b) dropping the wet mixture into at least one pile on a base surface;
   (c) allowing the wet mixture in the pile to substantially completely hydrolyze into a hard product; and
   (d) crushing the product to form the aggregate.

2. A method as claimed in claim 1 wherein said step (b) further comprises forming a stack having multiple overlapping piles of the dropped wet mixture such that the stack extends a distance over the surface.

3. A method as claimed in claim 2 wherein the wet mixture is transported from the mixer to over the surface and dropped to the surface by a radial stacker.

4. A method as claimed in claim 3 wherein the radial stacker is incrementally stepped through an arc stopping at angular positions of the arc to drop the wet mixture and form each of the piles of the stack such that the stack extends a circular distance over the surface.

5. A method as claimed in claim 4 wherein said step (b) further comprises running off water that seeps to the base surface from the stack and directing the water away from the piles and stack by having the base surface on a drainage base thats runs off water that seeps to the base surface from the stack and directs the water away from the piles and stack.

6. A method as claimed in claim 4 further comprising an excavation step (c1) between said steps (c) and (d), wherein said excavation step (c1) comprises excavating hydrolyzed portions of the stack to collect corresponding portions of the hard product and transporting the excavated portions of the hard product to a crusher for the crushing in said step (d) while the radial stacker is performing the dropping of the wet mixture in said step (b).

7. A method as claimed in claim 6 wherein in said step (b) the base surface is on a drainage base thats runs off water that seeps to the base surface from the stack and directs the water away from the piles and stack.

8. A method as claimed in claim 6 wherein said step (b) further comprises the radial stacker cycling through the entire arc in about between 20–30 days during which the piles and the stack are formed from a beginning of the stack to an end of the stack.

9. A method as claimed in claim 8 wherein said excavation step (c1) is initiated at the beginning of the stack after an initial curing period of the stack of about between 14 to 28 days after said step (b) is initiated and during which the stack is hydrolyzing.

10. A method as claimed in claim 9 wherein the excavation is done with a loader that breaks up the stack and transports the hard product to a crusher for crushing.

11. A method as claimed in claim 10 wherein said steps (a) through (d) are performed on a coal burning plant site using fly-ash from a combustion process of the plant.

12. A method as claimed in claim 10 wherein said step (b) further comprises running off water that seeps to the base surface from the stack and directing the water away from the piles and stack by having the base surface on a drainage base thats runs off water that seeps to the base surface from the stack and directs the water away from the piles and stack.

13. A method as claimed in claim 10 wherein the multiple overlapping piles are formed generally conical in shape, having peaks at heights in a range of about between 8 to 50 feet from the base surface, and having diameters at the base surface in a range of about between 16 to 100 feet.

14. A method for making aggregate comprising:
   (a) preparing a wet mixture by mixing water with a combination of ingredients in a mixer, the combination of ingredients comprising by weight about, 68% to 95% fly-ash, 2% to 10% lime and 0.5% to 12% alkali hydroxide;
   (b) dropping the wet mixture into at least one pile on a base surface;
   (c) allowing the wet mixture in the pile to substantially completely hydrolyze into a hard product; and
   (d) crushing the product to form the aggregate.

15. A method as claimed in claim 14 wherein said step (b) further comprises transporting the wet mixture from the mixer to over the surface and dropping the wet mixture to the surface by a radial stacker and forming a stack having multiple overlapping piles of the dropped wet mixture such that the stack extends a distance over the surface.

16. A method as claimed in claim 15 wherein the radial stacker is incrementally stepped through an arc stopping at angular positions of the arc to drop the wet mixture and form each of the piles of the stack such that the stack extends a circular distance over the surface.

17. A method as claimed in claim 15 further comprising an excavation step (c1) between said steps (c) and (d), wherein said excavation step (c1) comprises excavating hydrolyzed portions of the stack to collect corresponding portions of the hard product and transporting the excavated portions of the hard product to a crusher for the crushing in said step (d) while the radial stacker is performing the dropping of the wet mixture in said step (b).

18. A method as claimed in claim 16 wherein said step (b) further comprises the radial stacker cycling through the entire arc in about between 20–30 days during which the piles and the stack are formed from a beginning of the stack to an end of the stack.

19. A method as claimed in claim 18 wherein said excavation step (c1) is initiated at the beginning of the stack after an initial curing period of the stack of about between 14 to 28 days after said step (b) is initiated and during which the stack is hydrolyzing.

20. A method as claimed in claim 19 wherein said steps (a) through (d) are performed on a coal burning plant site using fly-ash from a combustion process of the plant.

21. A method as claimed in claim 19 wherein said step (b) further comprises running off water that seeps to the base surface from the stack and directing the water away from the piles and stack by having the base surface on a drainage base to run off water that seeps to the base surface from the stack and direct the water away from the piles and stack.

22. A method as claimed in claim 21 wherein the multiple overlapping piles are formed generally conical in shape, having peaks at heights in a range of about between 8 to 50 feet from the base surface, and having diameters at the base surface in a range of about between 16 to 100 feet.

* * * * *